United States Patent [19]

Fukayama et al.

[11] 3,972,070

[45] July 27, 1976

[54] MODE SELECTOR LOCKOUT MECHANISM FOR A CASSETTE TAPE RECORDER/REPRODUCER

[75] Inventors: Gary P. Fukayama, Roselle, Ill.; Laszlo N. Repay, Chagrin Falls, Ohio

[73] Assignee: Motorola, Inc., Schaumburg, Ill.

[22] Filed: Jan. 16, 1974

[21] Appl. No.: 433,961

[52] U.S. Cl. ................................ 360/77; 242/208; 360/74
[51] Int. Cl.² ................. G11B 23/04; G11B 15/44; G11B 19/16
[58] Field of Search ................. 360/69, 71, 74, 61, 360/62, 73, 96, 60; 242/199, 208

[56] References Cited
UNITED STATES PATENTS

| | | | |
|---|---|---|---|
| 2,535,498 | 12/1950 | Kornei | 360/71 |
| 3,037,093 | 5/1962 | Nowlan | 360/60 |
| 3,355,557 | 11/1967 | Laa et al. | 360/74 |
| 3,454,731 | 7/1969 | Hori et al. | 360/61 |
| 3,609,844 | 10/1971 | Ichikawa | 360/74 |
| 3,624,308 | 11/1971 | Kozu et al. | 360/73 |
| 3,659,857 | 5/1972 | Marcinkus | 360/74 |
| 3,735,054 | 5/1973 | Poshimura | 360/69 |
| 3,752,486 | 8/1973 | Nakamura | 360/62 |
| 3,765,685 | 10/1973 | Harlan et al. | 360/62 |

*Primary Examiner*—Alfred H. Eddleman
*Attorney, Agent, or Firm*—Margaret M. Parker; James W. Gillman

[57] ABSTRACT

A mode selector mechanism for a magnetic tape recorder/reproducer device for use with a cassette and having a housing, a cassette receiving opening, a tape drive mechanism and a plurality of actuators including a play, a stop and a record actuator, which actuators are movable from an outward at rest position to an inward operative position. A locking mechanism is positioned within the magnetic tape device housing and includes a first portion and a second portion, both portions being engageable with the actuators. When the tape transport is inserted into the tape player device, a solenoid is energized to move the first portion from a first position to a second position wherein it is selectively engageable by at least one of the actuators for holding the same in the inward operative position. The second portion of the locking mechanism is positioned within the housing and is engageable with the play actuator. Engagement of the play actuator with the second portion slidably moves the latter to prevent the inward movement of the record actuator. A connector arm is provided within the player and is engageable with either of the play or record actuators to effect engagement of the tape transport with the tape drive mechanism. The stop actuator is movable to an inward position for engagement with the first portion to disengage the play and record actuators, whichever is in the operative position.

10 Claims, 8 Drawing Figures

MODE SELECTOR LOCKOUT MECHANISM FOR A CASSETTE TAPE RECORDER/REPRODUCER

BACKGROUND

Cassette tape players utilizing pushbutton mode selectors have been developed for use where it is desirable to provide selective control over a number of different functions. Although some devices in use today incorporate a system to permit selection of certain play and record modes, generally these devices do not utilize mode selector lockout arrangements to prevent the depression of any of the mode selector controls when no cassette cartridge is inserted into the tape player or to prevent the depression of a record mode selector control when the play mode selector control is in an operative position.

SUMMARY OF THE INVENTION

It is one object of this invention to provide a mode selector mechanism to be mounted within a cassette tape player to enable the user thereof to select the mode of operation between the play and record modes of operation.

It is another object of this invention to provide a mode selector mechanism for a pushbutton mode selector cassette tape player.

Another object of the present invention is to produce a mode selector mechanism having a lock-in portion and a lockout portion for a pushbutton mode selector cassette tape player which can be assembled into a compact unit.

In accordance with one embodiment of the invention, a mode selector mechanism is used with a magnetic tape recorder/reproducer device including a tape transport or cassette and having a housing, a cassette receiving opening and a tape drive mechanism. The magnetic tape player includes a plurality of actuators, including at least a play, a stop and a record actuator, each having a plunger arm, slidably mounted in the housing and extending outwardly therefrom, and each being movable manually between an outward, at rest position and an inward, operative position. The mode selector mechanism includes a lock-in lever portion, positioned in the housing and operatively connected to a solenoid mounted in the housing, and a lockout lever portion positioned also in the housing beneath the first-mentioned lever portion. Upon the insertion of a cassette into the tape player, the solenoid is energized to pull the lock-in lever portion from a first position to a second position. When the lock-in lever portion is in the second position, it is selectively engageable with either the play or record actuator plunger arms to hold the same in the inward operative position. The lockout lever portion is also engageable by the play actuator plunger arm such that upon depression of the play actuator to its inward operative position, the lockout lever portion is slidably positioned to block the inward movement of the record actuator plunger arm. The end portions of the plunger arms of the play actuator and the record actuator are adapted to engage a connecting arm which is engageable with a linkage arm to effect engagement of the tape drive mechanism with the cassette tape. The stop actuator is movable to an operative position for engaging the lock-in lever portion for releasing the play and record actuators to an at rest position.

The lock-in lever portion which is slidably mounted within the housing, prevents depression of any of the actuators when no cassette tape cartridge is in the tape player. As mentioned above, the lockout lever portion also prevents the depression of the record actuator during the play mode operation to avoid erasure of information already recorded on the tape. Depression of the play actuator plunger arm after the record actuator plunger arm has been depressed to its inward operative position, releases the record selector control and the cassette player is then placed into the play mode. The mode selector mechanism therefore permits the user of the magnetic tape device to control the sequence of operation of the player with a minimum of effort and prevents the record mode to be utilized until the play mode has been operatively disengaged.

DETAILED DESCRIPTION

Figure 1:
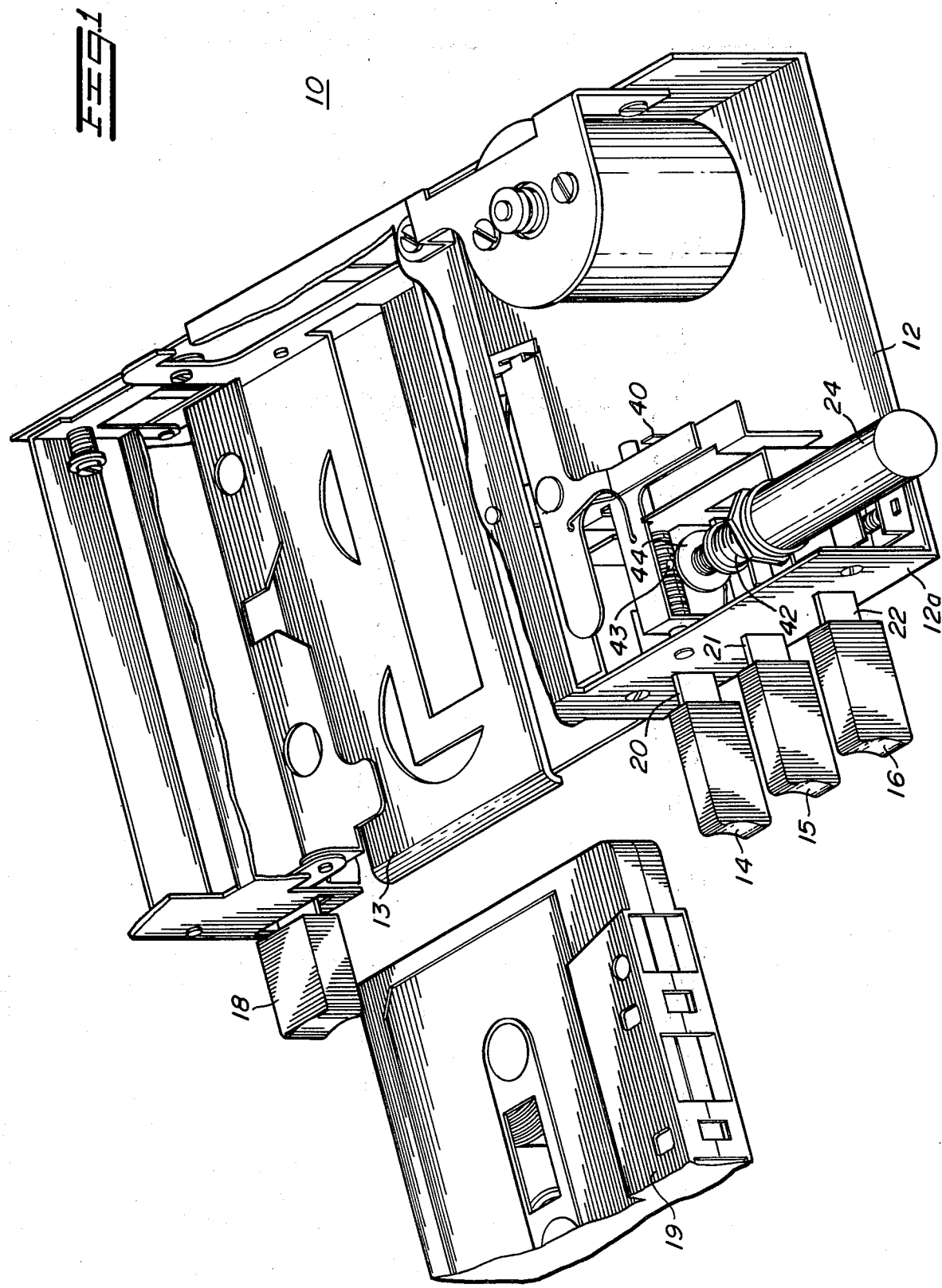
FIG. 1 is a perspective view of a cassette tape player with portions thereof broken away to illustrate the mode selector mechanism of this invention.

Referring now to FIG. 1, there is shown a magnetic tape recorder/reproducer device or cassette tape player, designated generally by reference number 10, of the type which may be installed in an automobile or other motor vehicle. The cassette tape player 10 includes a housing 12 having a front wall 12a through which a plurality of actuators extend. A play actuator 14, a stop actuator 15 and a record actuator 16 provide selection of either the play mode, stop mode or record mode, respectively, for the player by simply depressing the pushbutton inwardly. An ejector pushbutton 18 provides means for ejecting the tape transport or cassette cartridge 19 from the cassette tape device 10, as is well known in the art. The actuators 14, 15 and 16 each have plunger arms 20, 21 and 22, respectively. The plunger arms 20, 21 and 22 are movable inwardly in apertures formed in the housing front wall 12a of the cassette tape device 10. Several of these actuators will normally be found in line in the housing front wall 12a of the cassette tape device 10, each being preset to accomplish a specific mode selection function. To activate the mode selector mechanism, a solenoid 24 is utilized. In FIG. 1, the solenoid 24 is in the unactivated condition before cassette cartridge 19 has been inserted into the cassette tape player. The mechanism of the ejector pushbutton 18 is adapted to be engaged by the cassette cartridge 19 as it is inserted into the tape transport receiving opening 13 of the cassette tape device 10.

Figure 2:
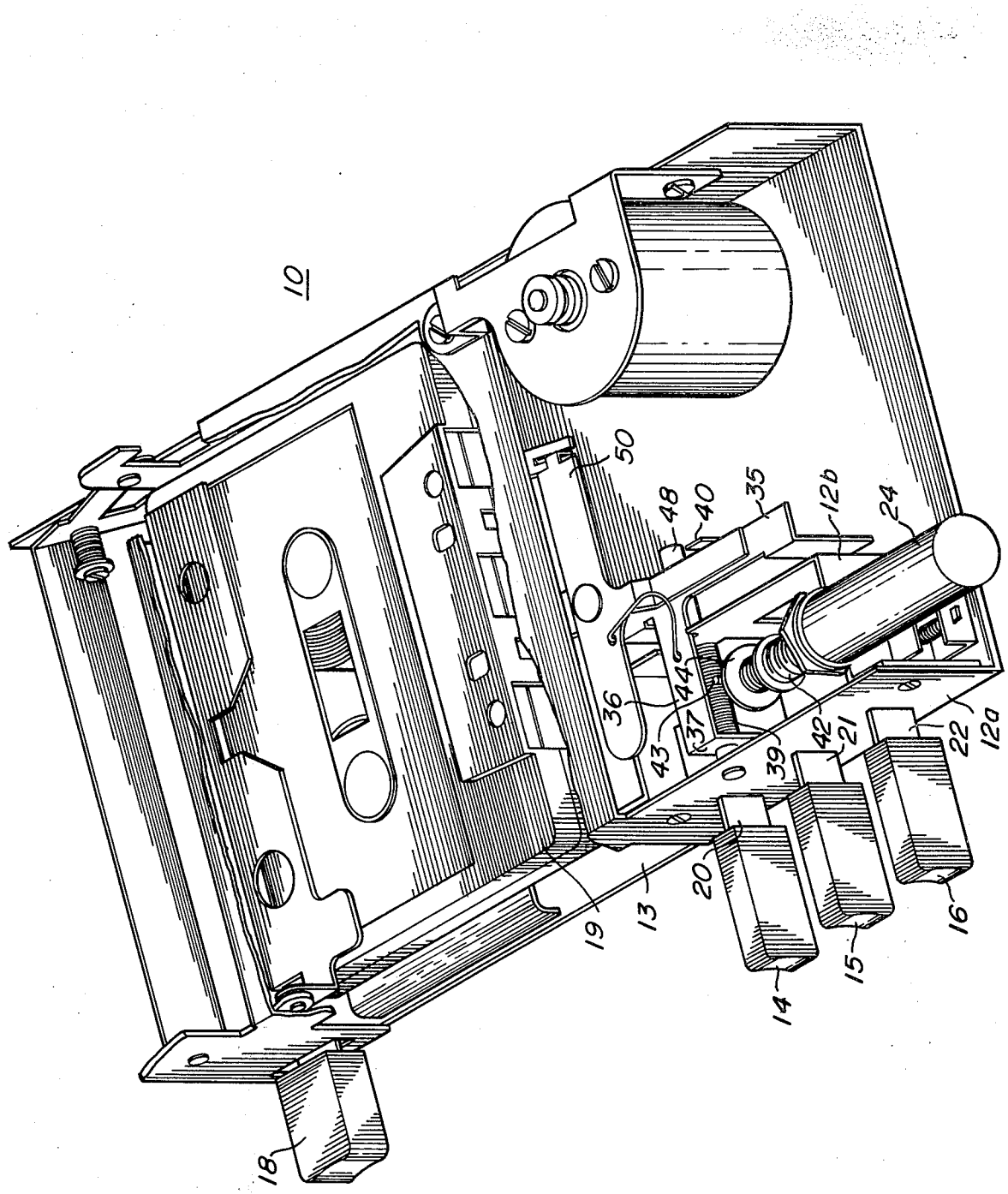
FIG. 2 is a perspective view of the cassette tape player of FIG. 1 with the cassette cartridge inserted into the player.

In FIG. 2, the cassette cartridge 19 is shown inserted into the cassette tape device 10 in an operative position. Upon the insertion of the cassette tape cartridge 19 into the magnetic tape device 10, the cassette tape cartridge 19 engages a switch 25 (FIG. 4), which switch closes a circuit (not shown) to energize the solenoid 24 to activate the mode selector mechanism of the present invention, as will hereinafter be described. The solenoid 24 includes an armature 41 and a pawl 43. At the end of the armature 41, a washer 44 is provided to retain a compression spring 42 mounted thereon to bias the armature 41 outwardly when the solenoid is deenergized.

Figure 3:
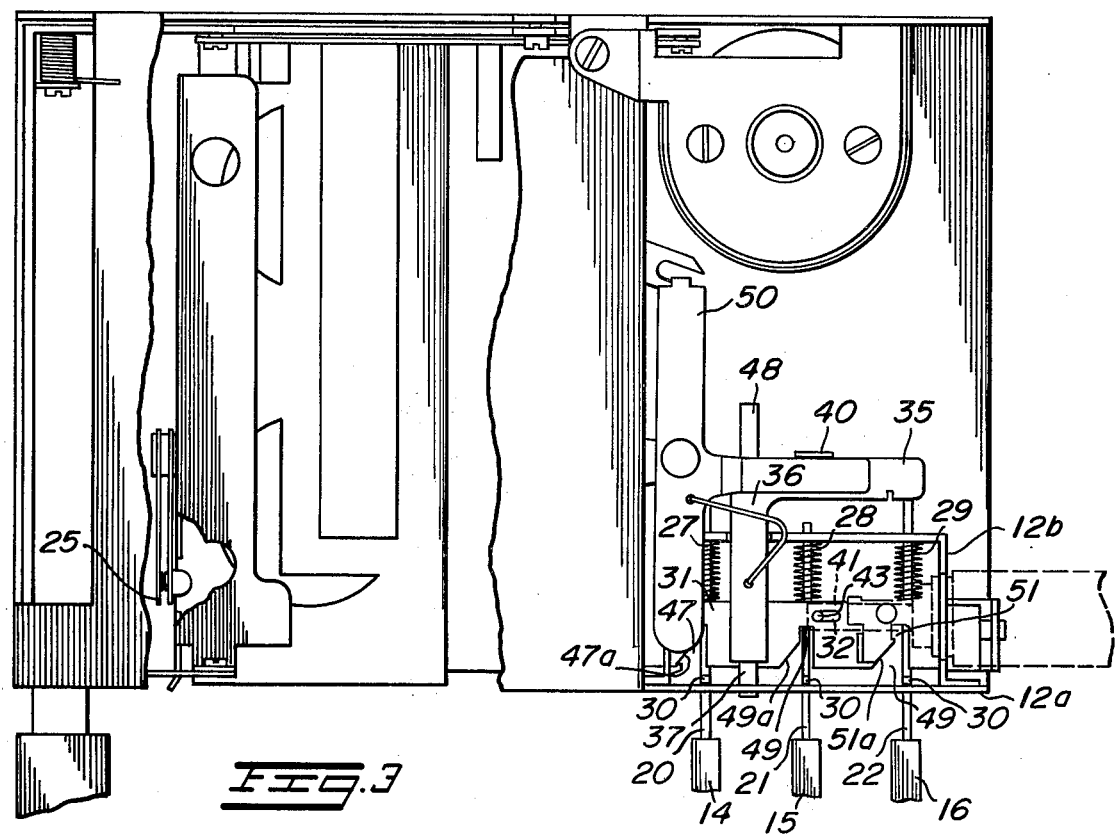
FIG. 3 is a plan view of the cassette tape player of FIG. 1.

Referring to FIG. 3, the actuators 14, 15 and 16 of the mode selector mechanism are shown. As mentioned heretofore, each of the actuators includes a plunger arm 20, 21 and 22, respectively. Each of the arms extends outwardly from the tape player 12 through an aperture in the housing front wall 12a and each of the plunger arms extends inwardly of the housing 12, such that the ends thereof project through apertures (not shown) in housing frame 12b, which apertures are aligned with the apertures in the housing front wall 12a. Each of the plunger arms contains a flange portion 26 (FIG. 7) intermediate its ends to provide anchor means for return compression springs 27, 28 and 29. The return compression springs 27, 28 and 29 are positioned around the plunger arm and anchored by the flange portion 26 and the housing frame 12b to bias a respective depressed actuator to the outward, at rest position. Additionally, each plunger arm includes a projection 30 (FIG. 7) extending upwardly and downwardly therefrom, which projections retain the plunger arms 20, 21 and 22 within the front panel 12a of the tape player device 10 and engage a lock-in slide member 31 and a lockout slide member 33 (FIG. 7), as will hereinafter be described.

Additionally, a bracket 35 is positioned within the housing to be engaged by either the play or record actuators to effect engagement of the tape drive mechanism with the tape transport 19. Bracket 35 includes a support portion 36 extending forwardly therefrom which has a flange portion 37 (FIG. 2) with an aperture therein. The flange portion 37 is slidably anchored to a shaft 48 extending therethrough. The shaft 48 is attached to both the front wall 12a and housing portion 12b within the tape player 10. The bracket 35 and flange portion 37 provide anchor means for a return spring 39 positioned around the shaft 48 to bias the bracket 35 outwardly. A lip portion 40 (FIG. 2) extends upwardly from bracket 35 and is engageable with a connecting arm 50, coupled to the tape drive mechanism, to disengage the tape drive mechanism when each of the actuators is in the outward, at rest position.

The lock-in slide 31 (FIG. 4) is mounted on housing frame 12b within tape player 10. The lock-in slide 31 is movable in a direction transverse the inward and outward movement of actuators 14, 15 and 16. The lock-in slide 31 includes an aperture 32 in which pawl 43 attached to solenoid armature 41, is received. The lock-in slide 31 also includes openings 47, 49 and 51 therein which are positioned for receipt of extensions 30 of plunger arms 20, 21 and 22, respectively. Cam surfaces 47a, 49a and 51a are provided adjacent the last-mentioned openings, respectively, for engagement with the plunger arm extensions 30.

The lock-in slide 31 is movable when one of the cam surfaces 47a, 49a and 51a is engaged by an extension 30 of a corresponding plunger arm. Lip portions 47b and 51b are formed on slide 31 at the edge of openings 47 and 51, respectively, for capturing extensions 30 of the respective play and record plunger arms 14 and 16 therein, to hold the plunger arms in an operated condition. The latter will be described in greater detail hereinafter. When the cassette cartridge 19 has not been inserted into the tape device 10, the solenoid 24 is in the deenergized condition and the lock-in slide 31 is positioned within the tape housing such that the front edge of the slide 31 prevent the depression of the play actuator 14 and the record actuator 16.

Figure 4:
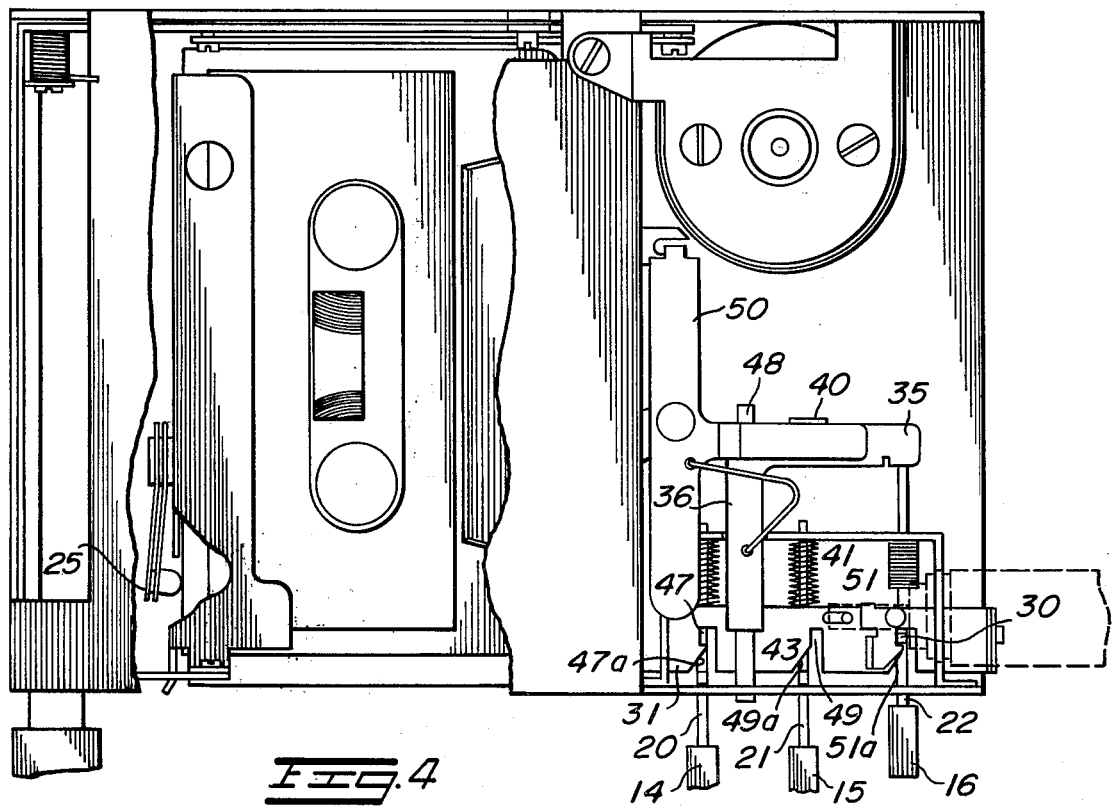
FIG. 4 is a plan view of the cassette tape player of FIG. 2.

As shown in FIG. 4, when a cassette is inserted into the tape device 10, the switch 25 energizes solenoid 24. Upon the energization of solenoid 24, the armature 41 and the attached pawl 43 are pulled inwardly (to the right of FIG. 4). Upon such movement, the pawl 43 engages the lock-in slide 31 to move the latter from a first position to a second position, thereby to place the mode selector mechanism in condition for an operator to select the specific mode of operation of the player. As shown in FIG. 4, the record actuator 16 has been depressed inwardly such that the end of the plunger arm 22 has engaged bracket 35 to move the same. Such movement of bracket 35 permits connecting are 50 to place the tape player tape drive mechanism into an operating condition with respect to cassette 19. Upon the full depression of the record actuator 16, projection 30 on the plunger arm 22 is received in opening 51 and is held in the inward record position by lip portion 51b.

Figure 7:
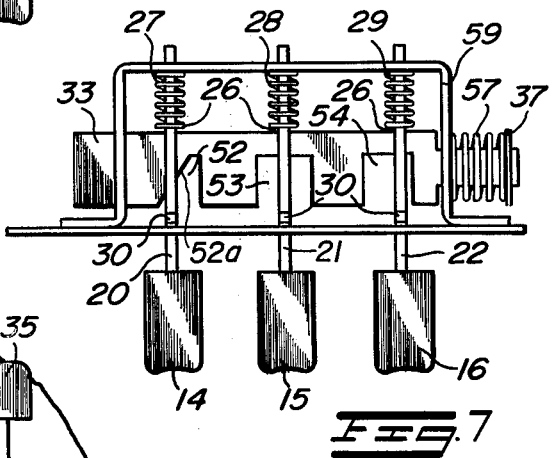
FIG. 7 is a partial enlarged plan view of the lockout slide in accordance with this invention.

In FIG. 7 the lockout portion of the mode selector mechanism is shown. The lockout portion includes the lockout slide 33 slidably mounted on housing frame 12b within the housing, beneath the plunger arms 20, 21 and 22. The lockout slide is also movable transverse the direction of movement of the plunger arms. One end of lockout slide 33 contains a flange portion 37 which provides anchor means for lockout slide return spring 57 positioned between the housing 12b and the flange portion 37 to retain the lockout slide in its at rest position. Additionally, the lockout slide 33 contains indentations 52, 53 and 54 which correspond to and are aligned with the inward path of the plunger arms 20, 21 and 22, respectively. A cam surface 52a is provided adjacent indentation 52 for engagement with extension 30 of plunger arm 20 extending downwardly from plunger arm 20. The indentation 53 positioned adjacent the stop mode plunger arm 21 is of a sufficient width such that the lateral movement of the lockout slide 33, when extension 30 of plunger arm 20 engages the cam surface 52a of lockout slide 33, does not prevent the depression of the stop mode plunger arm 21.

Figure 5:
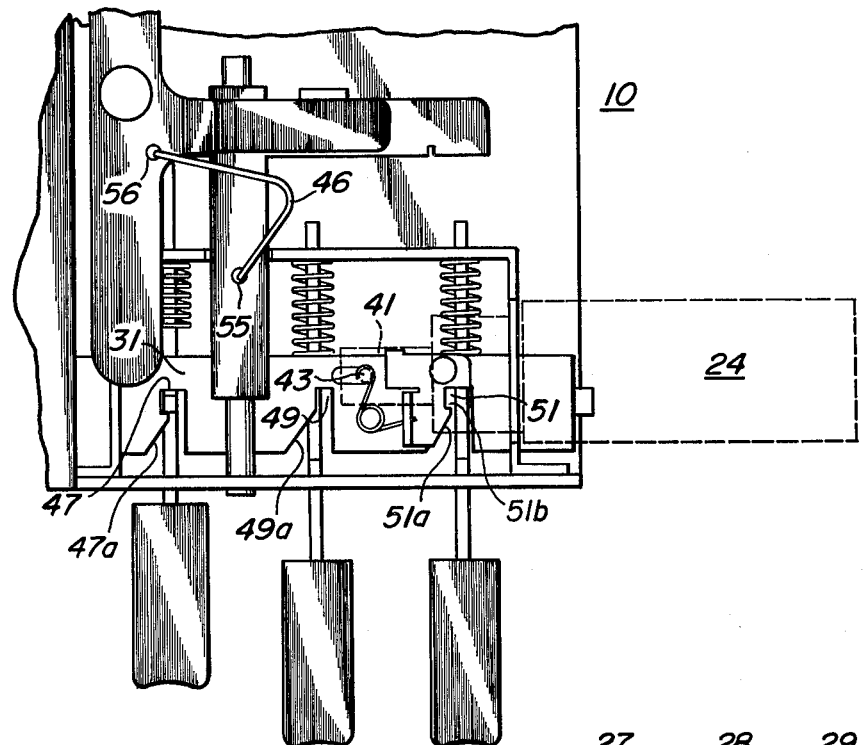
FIG. 5 is an enlarged plan view of the lockout mechanism according to the invention shown with the cassette cartridge in the tape player and the play mode actuator depressed.

In FIG. 5, cassette 19 has been inserted into the tape device 10 to engage the switch 25 which energizes solenoid 24 whereby plunger 41 thereof moves lock-in slide 31 laterally (to the right of the figure). When the play mode actuator arm 20 is depressed, extension 30 thereon is engaged by the lip portion 51b adjacent opening 51 and is held thereby in opening 51 in the inward, play position. As illustrated in FIG. 7, the inward movement of plunger arm 20 results in projection 30, extending downwardly therefrom, to engage the cam surface 52a adjacent indentation 52 on the lockout slide 33 to displace the same laterally. Such detent action results in the positioning of indentation 54 out of alignment with plunger arm 22 such that the front edge of lockout slide 33 will be engaged by projection 30 extending downwardly from the record actuator 22 to prevent the same from being depressed. Thus, when the play mode actuator is depressed, it is impossible to depress the record mode actuator without first returning the play mode actuator to its outward, at rest position. When the stop mode actuator 15 is depressed, the detent action between extension 30 and cam 49b results in the lateral displacement of the lock-in slide 31 such that the play mode actuator 14 is released and is returned by spring 27 to its outward, at rest position.

When the play actuator 14 is in the at rest position, the spring 39 (FIG. 2) returns bracket 35 to its forward position against housing frame 12b. Such movement of the bracket 35 causes portion 40 to engage connecting arm 50 to disengage the tape drive mechanism with respect to cassette 19. A spring 46, received in openings 55 and 56 in the support bracket 36 and connecting arm respectively, is utilized to provide the force necessary to cause the connecting arm 50 to engage the tape drive mechanism when either the play actuator 14 or record actuator 16 is depressed.

Figure 6:
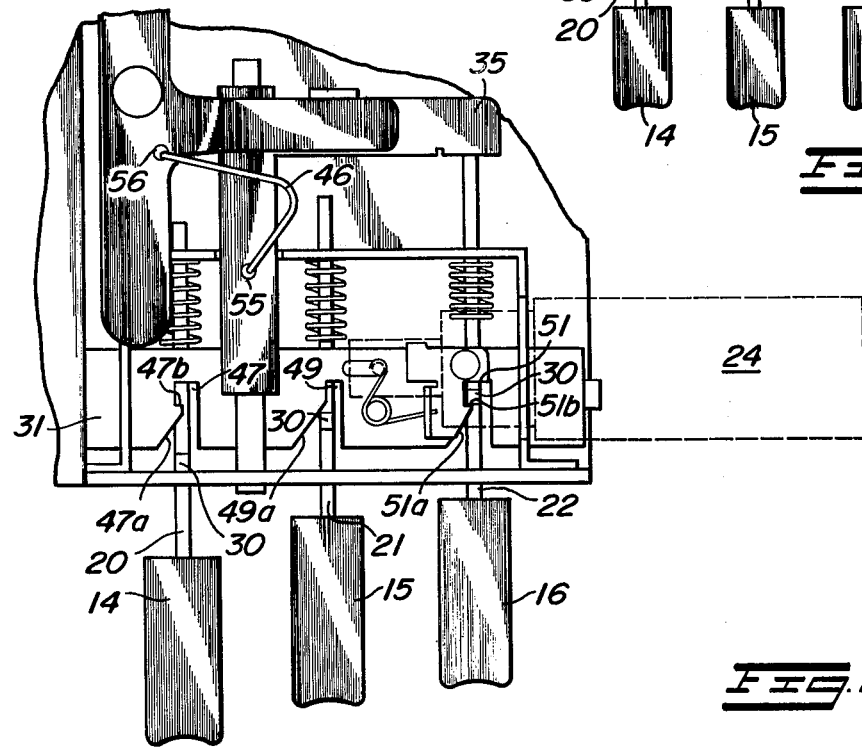
FIG. 6 is an enlarged plan view of the lockout mechanism according to the invention with a cartridge in the carriage and with the record play mode selector depressed.

In FIG. 6, the record actuator 16 is depressed and held in the record position by lip portion 51b on lock-in slide 31. To change the mode selection of the tape device 10 from the record mode to either the stop mode or the play mode, either the play mode actuator 14 or the stop mode actuator 15 may be depressed to engage the cams 47a and 49a, respectively. The latter slidably displaces the lock-in slide 31 to the left as seen in the figure to release the record mode actuator 16 which is biased outwardly by spring 29. As shown in FIG. 6, the stop mode actuator is partially depressed wherein the projection 30 upon plunger arm 21 is engaging cam 49a to slidably move the lock-in slide 31 to the left to disengage the record mode actuator 22 to reposition the latter to an outward, at rest position.

Figure 8:
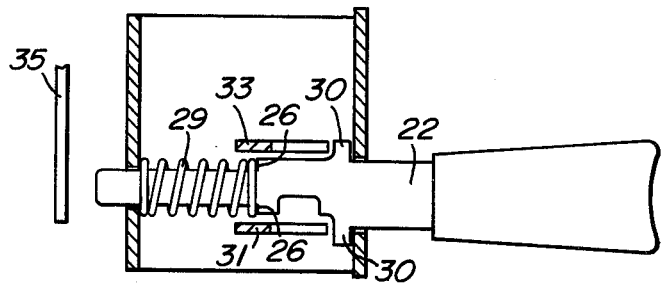
FIG. 8 is a partially sectionalized, side view of a mode actuator mechanism according to the invention.

FIG. 8 shows the actuator arm 22 and its two projections 30, 30 in spatial relation with the two slides 31, 33. Also shown are the return spring 29, the spring retaining flange 26 and the portion of bracket 35 which is contacted by the inner end of arm 22 to effect engagement of the tape drive mechanism with the tape transport 19. To summarize the operation of the slides as shown in FIGS. 3, 4 and 8, the lock-in slide 31 which is positioned above the pushbotton actuator arms, is pulled from left to right by the solenoid 24 when a cartridge is inserted into the player mechanism. When in the leftward position (FIG. 4) neither the play nor record arms can be depressed; only the stop arm can be depressed but will have no effect. When the slide 31 is to the right any arm can be depressed. If play is depressed, the projection 30 on the actuator arm 20 will push the lock-in slide 31 slightly to the left until the projection 30 passes the cam surface 47a. This action takes place against the bias of the small overcenter spring (shown in FIGS. 5 and 6) which is connected between the framework and the pawl 43. Thus when the projection 30 passes the cam surface 47a, the lock-in slide 31 returns to its second position. The depression of any pushbutton arm causes any previously engaged arm to be released. Lock-in slide 31 operates the same for record as for play, but the lockout slide 33 which is located below the pushbutton arm distinguishes between record and play function. The slide 33 is activated by the downward projection 30 of the play arm 20 from a rightward "at rest" position to a leftward position only when the play arm is depressed. In this latter position, the stop actuator arm can be depressed but the forward edge of the slide 33 will prevent the record actuator arm 22 from being depressed.

What has been described is a simple and efficient mode selector mechanism for holding either the record or play mode actuators in operative position, for preventing the depression of the record mode actuator when the play mode actuator is in operative position and for preventing the depression of any of the mode actuators when no cassette cartridge has been inserted into the cassette tape player.

We claim:

1. A mode selector mechanism for use in a magnetic tape recorder/reproducer device adapted for receipt of a tape cassette, and having a housing, a cassette receiving opening and a tape drive mechanism, the combination including:

a plurality of actuators mounted in said housing and including at least a play and a record actuator, each having a plunger arm portion extending outwardly therefrom and each being slideably movable between an at rest position and an operative position, connector means coupled to said tape drive mechanism and engageable with at least one of said actuator plunger arm portions for actuating the tape drive mechanism to an operative condition with respect to said tape cassette, means mounted in the housing having an arm movable between an unoperated and operated position in accordance with the insertion of a cassette into the receiving opening for activating the mode selector mechanism, and, actuator locking means positioned in the housing and having a first portion engaged by said arm, said first portion of said locking means being movable from a first position to a second position when said arm is in said operated position, said portion, when in said second position, being selectively engageable with at least one of said actuator plunger arms with the same being moved to the operative position to hold the said plunger arm in said last-mentioned position, said first portion being moved from the second to the first position to prevent movement of said actuator to the operative position, said locking means further including a second portion engageable by said play actuator arm when the latter is moved to said operative position, said second portion being moved from a first to a second position to prevent the movement of the record mode selector plunger arm portion to an operated position while said play actuator is in said operative position.

2. A mode selector mechanism as claimed in claim 1 further including a stop mode actuator, said stop mode actuator including a plunger arm portion positioned for sliding movement between an at rest position and an operated position, said stop mode plunger arm portion being engageable with said first locking means portion while one of said play and record actuators is in an operated condition to cause said locking means portion to release said one of said play and record actuators, said tape drive mechanism in response thereto returning to an inoperative state.

3. The mode selector mechanism as claimed in claim 1 wherein said means including said arm includes a solenoid energizeable upon insertion of a cassette into said cassette receiving opening for moving said arm between said unoperated and operated positions.

4. The mode selector mechanism as claimed in claim 1 wherein the first portion of said locking means includes a member positioned within the housing and having a plurality of cam surfaces thereon, said surfaces being engageable by respective ones of said actuator plunger arms upon movement thereof to an operated position to move said member between said first and second positions, said member further including openings therein for receipt of said plunger arms, said one plunger arm being captured in a corresponding opening in the operated position upon movement thereof to said position.

5. The mode selector mechanism in accordance with claim 4 wherein the second portion of said locking means includes a member positioned within the housing and having a cam surface thereon aligned with said play actuator arm when said member is in said first position, and a plurality of indentations, one of which is provided adjacent said cam surface, the other of said indentations being positioned for alignment with said other actuator plunger arms, said play actuator plunger arm engaging said cam surface to move said member upon movement of said play actuator plunger arm to said operated position to move one of said other indentations out of alignment with said record mode player arm to block the movement of said record mode player arm to said operated position while said play plunger arm is in said operated position.

6. The mode selector mechanism in accordance with claim 1 wherein said connector means includes a bracket portion slideably mounted within the housing and positioned for engagement by said play and record mode selector plunger arms and a connector portion which engages the tape drive mechanism.

7. The mode selector mechanism in accordance with claim 1 wherein said plunger arms each include a first projection extending upwardly therefrom for engagement with said first portion of said locking means to hold said plunger arms in the operated position and a second projection extending downwardly therefrom for engagement with said second portion of said locking means.

8. A mode selector lockout mechanism for a cassette tape player having a housing, a cassette receiving opening and a tape drive mechanism, the combination including:
   a plurality of mode selector actuators including at least a play, a stop and a record selector actuator mounted on said housing and each having a plunger arm extending outwardly therefrom, each said plunger arm being movable slideably between a first, at rest position and a second, operative position;
   connector means coupled to said drive mechanism and being engageable with at least one of said mode selector plunger arms to move the tape drive mechanism into an operative position with respect to a cassette tape cartridge received in said tape player;
   solenoid means mounted in said housing and energizable upon insertion of said cassette into the cassette receiving opening, said solenoid means including an armature movable between a first, unoperated position and a second, operated position in accordance with the energization of said solenoid means;
   lock-in means provided in said housing engageable by the armature of said solenoid means, said lock-in means being movable slideably from a non-operative position to an operative position upon energization of said solenoid means and thereafter selectively engageable by at least one of said mode control plunger arms for holding said one plunger arm in said second position when said mode control plunger arm is in the operative position; and
   lockout means provided in said housing and engageable by the play mode selector arm for movement to a position for blocking the inward movement of the record mode selector arm while said play mode selector arm is in said operative position.

9. A mode selector lockout mechanism as claimed in claim 8 wherein said stop mode selector plunger arm is positioned for engagement with said lock-in means while one of said play and record mode selectors is in said second, operated position to cause said lock-in means to release said one mode selector.

10. A mode selector lockout mechanism as claimed in claim 9 wherein said lock-in means includes a first movably mounted member having a plurality of cam surfaces, said cam surfaces being aligned with predetermined ones of said mode selector plunger arms when said member is in said operative position, said member defining also a like number of openings therein adjacent said cam surfaces and wherein said lockout means includes a second movable mounted member positioned adjacent said lock-in member and having a cam surface provided in alignment with said play mode selector plunger arm, said lock-in member being engaged at said cam surfaces by respective plunger arms upon moving the latter between an unoperated and operated position to guide said plunger arms into corresponding adjacent openings to capture predetermined ones of said plunger arms in the operated position, said lockout member being engageable at said cam surface by said play mode plunger arm upon movement of the latter to said operated position to cause said lock-in member to release said record mode plunger arm when the latter is held in the operated condition by said lock-in member, said lockout member blocking movement of said record mode plunger arm to prevent movement thereof to an operated condition when said play mode selector arm is held in an operated position by said lock-in member.

* * * * *